United States Patent [19]
Manchester et al.

[11] Patent Number: 6,144,399
[45] Date of Patent: Nov. 7, 2000

[54] PASSIVE SYSTEM USED TO MERGE TELEPHONE AND BROADBAND SIGNALS ONTO ONE COAXIAL CABLE

[75] Inventors: Earl E. Manchester, Longmont; Miles E. Musselman, Westminster, both of Colo.

[73] Assignee: MediaOne Group, Inc., Englewood, Colo.

[21] Appl. No.: 09/276,058

[22] Filed: Mar. 25, 1999

[51] Int. Cl.$^7$ ...................................................... H04N 7/10
[52] U.S. Cl. ................... 348/6; 348/12; 348/13; 455/5.1; 333/126; 333/129; 333/132
[58] Field of Search .................... 348/6, 12–13, 348/552; 455/3.1, 5, 6.3; 333/126, 129, 132, 167; 379/344, 345

[56] References Cited

U.S. PATENT DOCUMENTS

| | | | |
|---|---|---|---|
| 5,027,426 | 6/1991 | Chiocca, Jr. ................................. | 455/5 |
| 5,440,335 | 8/1995 | Beveridge ................................... | 348/13 |
| 5,642,155 | 6/1997 | Cheng ......................................... | 348/12 |
| 5,729,824 | 3/1998 | O'Neill et al. ............................. | 455/3.1 |
| 6,029,047 | 2/2000 | Ishida et al. ............................... | 455/6.2 |

OTHER PUBLICATIONS

Brochure: Tratec's Complete Range—Isolators, Wall Outlets, Accessories (1997).

*Primary Examiner*—Andrew I. Faile
*Assistant Examiner*—Hai V. Tran
*Attorney, Agent, or Firm*—Brooks & Kushman P.C.

[57] ABSTRACT

An apparatus and a method for simultaneously transporting telephone signals and broadband signals on a single coaxial cable. The ring line and tip line of the telephone signals are dc coupled onto the inner and outer conductors of the coaxial cable, while the information wire and reference ground of the broadband signal are ac coupled onto the inner and outer conductors of the coaxial cable respectively. Low pass filters at each end of the coaxial cable pass the telephone signal in and out of telephone jacks while blocking the broadband signals. High pass filters at each end of the coaxial cable allow the broadband signals to pass in and out of coaxial connectors while blocking the telephone signals. The coaxial cable is isolated from earth ground to prevent shorting of the telephone electrical power to earth ground. A ground block may be added to connect the reference ground of the incoming broadband signal to earth ground. The ground block may include surge suppression to protect the information wire of the incoming broadband signal.

10 Claims, 3 Drawing Sheets

PASSIVE SYSTEM USED TO MERGE TELEPHONE AND BROADBAND SIGNALS ONTO ONE COAXIAL CABLE

TECHNICAL FIELD

The invention relates to the field of simultaneously transporting telephone and broadband signals on a single coaxial cable.

BACKGROUND ART

Cable and telephone services have traditionally been offered to subscribers by different companies. The telephone services developed around a unified national network that utilized twisted wire pairs to connect the subscriber's telephone to a central office. With the appearance of local cable television services, new networks of coaxial cables were introduced locally to carry the radio frequency video signals to the subscriber's televisions, video cassette recorders, set top boxes and the like. As a result, having two sets of wires coming into their buildings is common for subscribers, a twisted wire pair for telephone services, and a coaxial cable for video services.

In recent years, the division between telephone and cable services (sometimes referred to as "broadband") has blurred. Cable companies have started offering telephone and Internet access services using the wide bandwidth made available by their coaxial cable networks. Telephone companies, in turn, have started offering other services, including television services and high speed digital network services. Telephone companies have become more numerous giving subscribers choices among several companies instead of just one regional Bell company. This expansion of services often requires subscribers to have several sets of wiring installed in their buildings. Where cosmetic appearances are important, installing new wires in an existing structure can be expensive. One solution to the problem is to merge the telephone signals and the broadband signals onto one set of wires outside the buildings, route them through the existing wires within the building, and then separate them at their destination inside. For existing buildings this approach avoids the need to lay new wiring. In new structures this approach saves on the total amount of wiring that needs to be installed.

A merged telephone/broadband solution must deal with the different requirements of balanced telephone signals (including the power, voice, ringing, and other signals) and unbalanced broadband signals used for video and high speed data. Twisted wire pairs are suitable for low frequency balanced signals over long distances because the physical placement of each wire in the pair results in equal exposure to external electromagnetic noise. When external noise is induced on a twisted wire pair cable it generally appears on each wire of the pair simultaneously. The equipment receiving the induced noise on the twisted wire pair can filter it out by canceling the noise signal on one wire with the equal noise signal on the other wire. Twisted wire pair, however, is not well suited for the higher radio frequencies of cable television because the wires act as antennas that broadcast the broadband signals out into space.

In coaxial cable design, an outer conductor surrounds and shields the inner conductor used to carry the information. The outer conductor prevents the radio frequency signals on the inner conductor from broadcasting outside the cable. This helps make coaxial cable suitable for carrying broadband signals over long distances. The outer conductor also acts to shield the inner conductor from external electromagnetic noise sources. Any external noise reaching the coaxial cable is captured by the outer conductor, none of the noise is induced on the information carried by the inner conductor. To dispose of the unwanted noise signals, the outer conductor is normally connected to earth ground at regular intervals.

While coaxial cable works well for the unbalanced signals of cable television, it is not ideal for the balanced telephone signals. Carrying telephone signals on coaxial cable causes external noise to be induced in only one of the two telephone lines—the line carried on the outer conductor. This results in an imbalanced noise on the telephone lines that cannot be distinguished from the voice information. Another problem with telephone signals on coaxial cable is that the telephone signals include electrical power. For a coaxial cable to carry this power, the outer conductor would have to be isolated from earth ground so as not to short the electrical power to ground.

U.S. Pat. No. 5,440,335 issued to Beveridge on Aug. 8, 1995 provides an approach to carrying merged telephone and broadband signals, over long distances using a pair of coaxial cables. By carrying the telephone's tip line on the inner conductor of one coaxial cable and the telephone's ring line on the inner conductor of the second coaxial cable, the balance between the two telephone lines is maintained. The patent also discloses using the inner conductor of each coaxial cable to carry a broadband signal frequency multiplexed above the telephone signals. An advantage of this approach is the ability to supply two independent broadband channels and one telephone service to a subscriber using only two coaxial cables. A limitation of this approach is the need to route two sets of coaxial cables to each subscriber.

A practical solution for combining telephone and broadband signals on a signal cable is to use one coaxial cable for only short distances in electromagnetically quiet areas. For example, in existing multiple dwelling apartment buildings all of the coaxial cables used for cable television are routed from a central lock box, usually located just outside the building, through the walls of the building to the individual apartments. By inserting the telephone signals onto the coaxial cables in the lock box, and then returning the telephone signals to twisted wire pairs once inside the apartments, the noise levels induced on the telephone signals can be kept to acceptably low levels. An advantage in this approach is that new telephone services can be provided to cable television subscribers without the expense of installing new wire s throughout the building.

DISCLOSURE OF INVENTION

The present invention is an apparatus and a method for transporting telephone signals and broadband signals on a single coaxial cable simultaneously. The ring line and tip line of the telephone signal are dc coupled onto the inner and outer conductors of the coaxial cable respectively, while the information wire and reference ground of the broadband signal are ac coupled onto the inner and outer conductors of the coaxial cable respectively. Low pass filters at each end of the coaxial cable pass the telephone signal in and out of telephone jacks while blocking the broadband signals. High pass filters at each end of the coaxial cable allow the broadband signals to pass in and out of coaxial connectors while blocking the telephone signals. The coaxial cable is isolated from earth ground to prevent shorting of the telephone electrical power to earth ground. A ground block may be added to connect the reference ground of the incoming broadband signal to earth ground. The ground block may include surge suppression to protect the information wire of the incoming broadband signal.

Accordingly, it is an object of the present invention to provide an apparatus that simultaneously transports a telephone signal and a broadband signal between two locations on a single coaxial cable.

Another object is to provide a low pass filter at each location to isolate the telephone signal from the combined telephone and broadband signal on the coaxial cable.

Another object is to provide a high pass filter at each location to isolate the broadband signal from the combined telephone and broadband signal on the coaxial cable.

Yet another object of the present invention is to provide a method for simultaneously transporting a television signal and a broadband signal between two locations over a single coaxial cable.

Another object is to provide a low pass filtering method at each location to isolate the telephone signal from the combined telephone and broadband signal on the coaxial cable.

Another object is to provide a high pass filtering method at each location to isolate the broadband signal from the combined telephone and broadband signal on the coaxial cable.

These and other objects, features and advantages will be readily apparent upon consideration of the following detailed description in conjunction with the accompanying drawings.

BEST MODE FOR CARRYING OUT THE INVENTION

Figure 1:
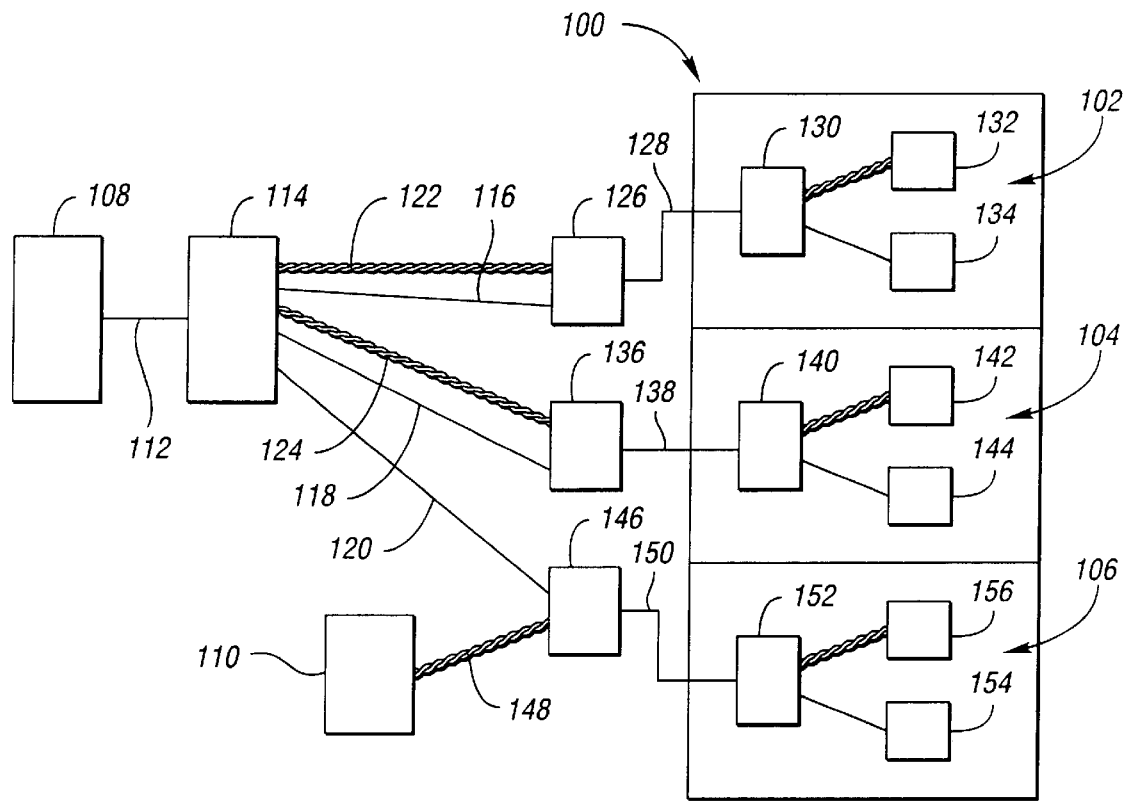
FIG. 1 is a block diagram of a system in accordance with the present invention.

FIG. 1 is a block diagram showing the present invention in use in a typical example of a multiple dwelling apartment building 100. Broadband services are provided to a first apartment 102, a second apartment 104, and a third apartment 106 by a first company 108. The first company 108 also provides telephone services to the first and second apartments 102 and 104. A second company 110 provides the telephone services to the third apartment 106.

The first company 108 delivers the broadband and telephone services over a high speed network 112, for example a hybrid fiber optic coax network, to a network interface 114 located near apartment building 100. Network interface 114 bridges the high speed network 112 to multiple exterior coaxial cables 116, 118 and 120, and multiple exterior telephone twisted wire pairs 122 and 124. Exterior coaxial cable 116 and exterior twisted pair 122 connect to a first combiner 126 outside the apartment building 100. The first combiner 126 inserts the telephone and broadband signals onto a first home-run coaxial cable 128 that carries them into the first apartment 102. Inside apartment 102 a first splitter 130 separates the telephone and broadband signals and makes them available to a telephone 132 and a television 134 respectively. Exterior coaxial cable 118 and exterior twisted wire pair 124 connect to a second combiner 136, also located outside the apartment building 100. Combiner 136 places the telephone and broadband signals onto a second home-run coaxial cable 138. Second home-run coaxial cable 138 carries the telephone and broadband signals into the second apartment 104 where a second splitter 140 separates them for use by another telephone 142 and another television 144. For the third apartment 106, first company 108 only provides broadband services, thus only exterior coaxial cable 120 connects the network interface 114 to a third combiner 146. Telephone services from the second company 110 are provided to the third combiner on twisted wire pair 148. Third combiner 146 combines the telephone and broadband signals onto a third home-run coaxial cable 150 that connects to a third splitter 152 inside the third apartment 106. Third splitter 152 separates the broadband signal provided by the first company 108 for use by television 154, and separates the telephone signal provided by the second company 110 for user by telephone 156. It should be noted that the example shown in FIG. 1 is intended for illustration purposes only. This example is not meant to be a limitation of the present invention.

Figure 2:
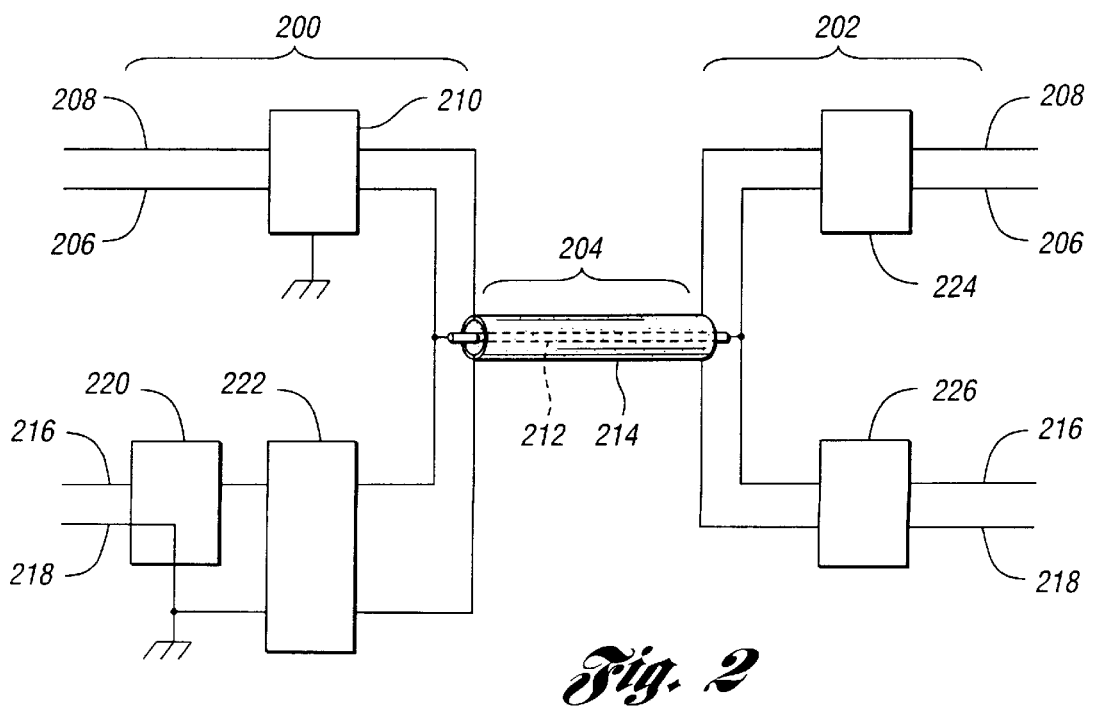
FIG. 2 is a block diagram of the present invention.

FIG. 2 is a block diagram of the present invention. The three basic components are the combiner 200 at the first location, the splitter 202 at the second location, and a home-run coaxial cable 204 running between locations. A telephone signal is brought to the combiner 200 by a telephone service provider (not shown). The telephone signal is defined by the voltages and currents on a ring line 206 and a tip line 208. The telephone signal includes at least voice information in the 0 to 4 kHz range, −48 Vdc electrical power, ±105 Vac 20 Hz ringing power and a current signal that indicates that the handset has been lifted. At the combiner 200, ring line 206 and tip line 208 are connected to a first low pass filter 210 that passes everything from direct current (dc) to a roll off frequency. The roll off frequency is chosen to be above 50 kHz and below 5 MHz. Designing the roll off frequency at or above 50 kHz allows for devices such as computer modems to operate beyond the 4 kHz bandwidth required for voice. The roll off frequency must be kept below 5 MHz in order to prevent the broadband signal from propagating back toward the telephone service provider. First low pass filter 210 connects the ring line 206 and the tip line 208 to the inner conductor 212 and outer conductor 214 respectively of the home-run coaxial cable 204.

The broadband signal is brought to the combiner 200 from a broadband service provider (not shown). The broadband signal is defined by the voltage between an information wire 216 and a reference ground 218. Broadband signal frequencies and can range from 5 MHz to more than 750 MHz. Combiner 200 may include a ground block 220. Ground block 220 provides a path to earth ground for lighting and other sources of electrical power that may be imposed on the outer conductor of the coaxial cable (not shown) that brings the broadband signal to the combiner 200. Ground block 220 may also provide surge protection for the inner conductor (information wire 216) to dissipate most of the electrical power that a high voltage surge may inject into the combiner 200. Optionally, the ground block 220 may be a separate unit external to combiner 200. After the ground block 220 the broadband signal is connected to a first high pass filter 222. In addition to its filtering function, first high pass filter 222 also alternating current (ac) couples the information wire 216 and ac couples the reference ground 218 to the inner conductor 212 and outer conductor 214 respectively of the home-run coaxial cable 204. First high pass filter 222 blocks all frequencies below a roll off frequency set between 50 kHz and 5 MHz, including dc signals. The 50 kHz limit is required to prevent the telephone signals from propagating out onto the broadband network. The 5 MHz limit is required to allow passage of the broadband signal. Ac coupling to the outer conductor 214 provides isolation between the telephone electrical power and earth ground.

Home-run coaxial cable 204 carries the combined telephone signal and broadband signal between the combiner 200 and the splitter 202. The presence of the telephone electrical power places two restrictions on the home-run coaxial cable 204. First, the outer conductor 214 must remain ungrounded to avoid shorting the telephone electrical power to earth ground. Second, ac signal splitters cannot be installed between the combiner 200 and splitter 202 as they would prevent the electrical power from reaching the telephones.

In splitter 202, a second low pass filter 224 removes the telephone signals from the inner conductor 212 and outer conductor 214 to reestablish the ring line 206 and tip line 208 at the subscriber's location. Second low pass filter 224 also has a roll off frequency set in the 50 kHz to 5 MHz range so it acts to block the broadband signals from the subscriber's telephone (not shown).

Figure 3:
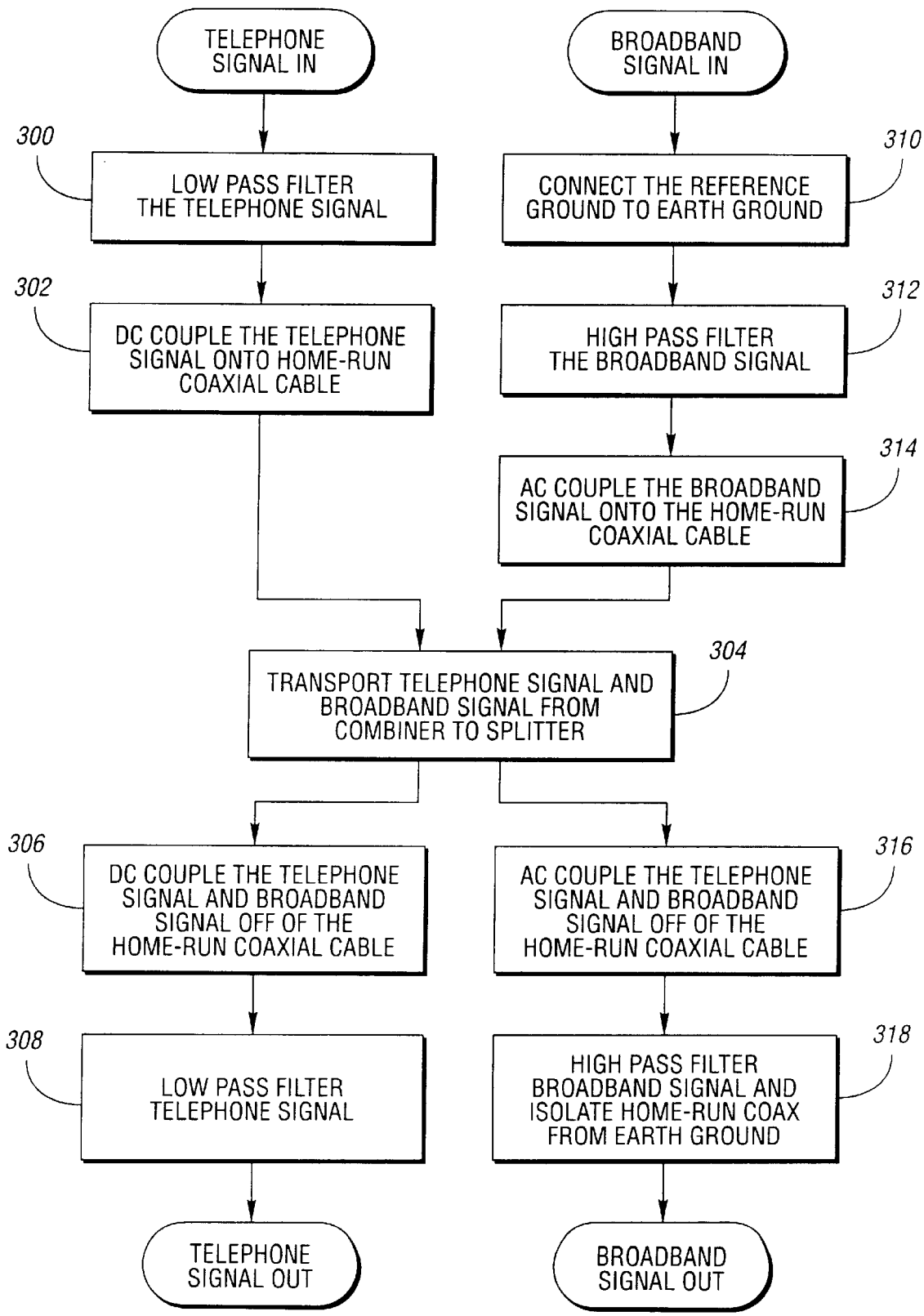
FIG. 3 is an operational flow diagram of the present invention.

Splitter 202 also contains a second high pass filter 226. Second high pass filter 226 removes the broadband signal from the inner conductor 212 and outer conductor 214 to reestablish the information line 216 and reference ground 218 at the subscriber's location. The second high pass filter 226 also ac couples the inner conductor 212 and the outer conductor 214 of the home-run coaxial cable 204 to the information line 216 and reference ground 218 at the subscriber's location. The filtering and ac coupling are required to block the telephone signals, and importantly the telephone electrical power from the cable inputs of the subscriber's video and broadband equipment. The roll off frequency for the second high pass filter 226 is set between 50 kHz and 5 MHz. In practice, the roll off frequencies of high pass filters 222 and 226 should be designed at higher frequencies than the roll off frequencies of low pass filters 210 and 224. This roll off frequency separation eliminates the possibility of having a band of frequencies on the home-run coaxial cable 204 that the splitter 202 cannot be isolated to just the telephone signal or just the broadband signal FIG. 3 is an operational flow diagram of the present invention. The first operation for the telephone signal is to low pass filter the telephone signal, as shown in block 300. Next, the telephone signal is dc coupled to the home-run coaxial cable 204, as shown in block 302. Home-run coaxial cable 204 then carries the telephone signal from the combiner 200 to the splitter 202, as shown in block 304. Once at splitter 202, the telephone signal and broadband signals are dc coupled off the home-run coaxial cable 204, as shown in block 306. Finally, the combined signals are low pass filtered to block the broadband signal and pass the telephone signal, as shown in block 308.

The first operation for the broadband signal is to connect the reference ground 218 to earth ground at the combiner 200, as shown in block 310. The broadband signal is then high pass filtered as shown in block 312. Next, the broadband signal is ac coupled to the home-run coaxial cable 204. The ac coupling isolates the outer conductor 216 of the home-run coaxial cable 204 from earth ground and thus prevents the telephone electrical power from being shorted to ground. Home-run coaxial cable 204 transports the broadband signal from the combiner 200 to the splitter 202, as shown in block 304. At splitter 202, the broadband signal and telephone signal are ac coupled off the home-run coaxial cable 204, as shown in block 316. Finally, the combined signals are high pass filtered to block the telephone signals and pass the broadband signals, as shown in block 318.

Figure 4:
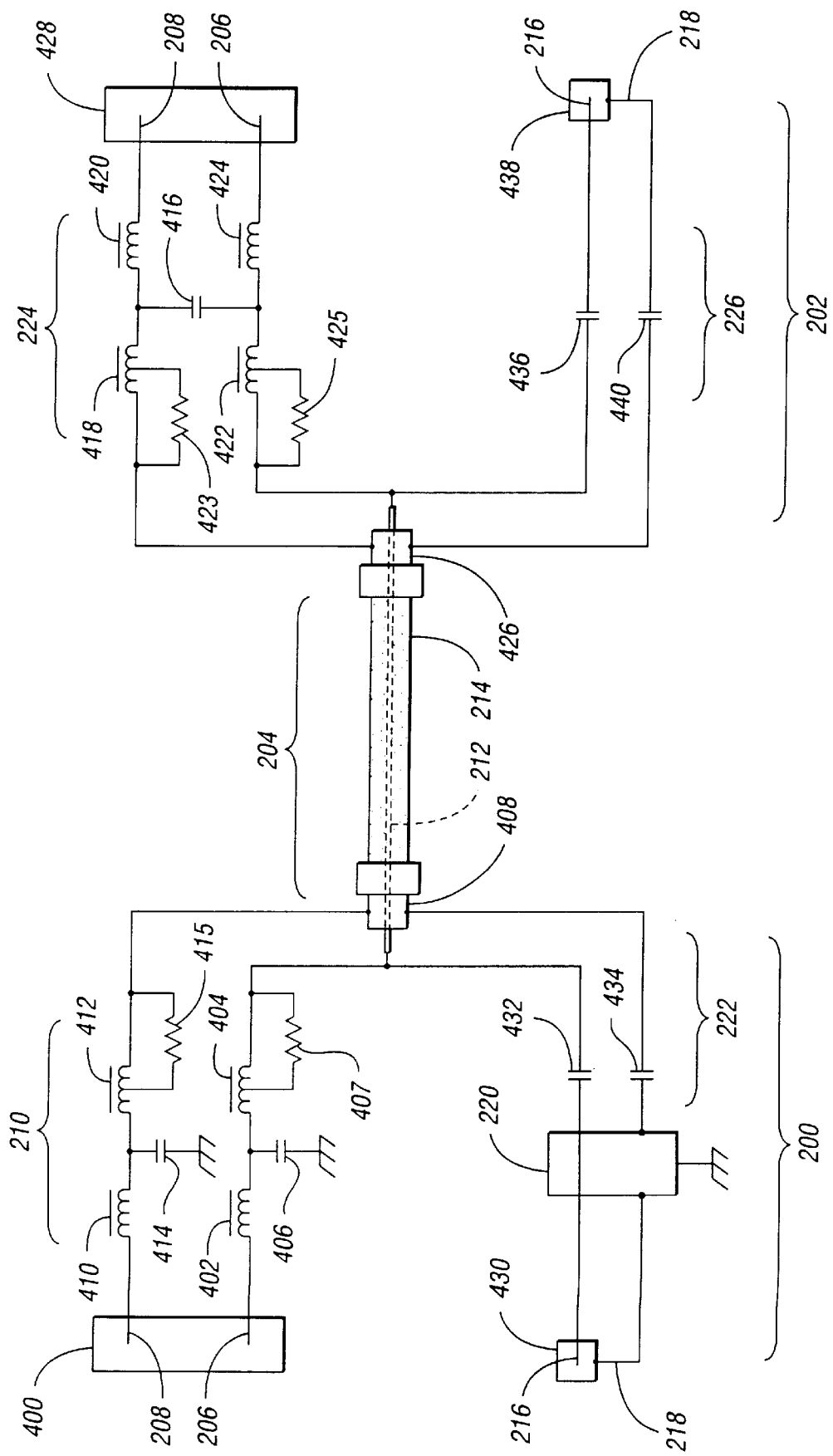
FIG. 4 is a schematic of the preferred embodiment.

FIG. 4 is a schematic of the present invention. Telephone signals enter combiner 200 through a standard RJ-11 jack 400. Ring line 206 is connected to a T-type filter within the first low pass filter 210. The T-type filter comprises a pair of inductors 402 and 404 with a capacitor 406 connected from the junction between inductors 402 and 404 to earth ground. The T-type filter also includes resistor 407 that is connected across part of the inductor 404. Inductor 404 is also dc coupled to the inner conductor 212 of the home-run coaxial cable 204 through F-fitting connector 408. Tip line 208 connects to a second T-type filter within the first low pass filter 210. The second T-type filter comprises a second pair of inductors 410 and 412 with a capacitor 414 connected from the junction between inductors 410 and 412 to earth ground. Resistor 415 is connected across part of inductor 412. Inductor 412 is dc coupled to the outer conductor 214 of the home-run coaxial cable 204 through F-fitting 408. Inductors 402, 404, 410 and 412 have a value of 470 $\mu$H and capacitors 406 and 414 have values of 0.01 $\mu$F giving the first low pass filter 210 a roll off frequency of approximately 74 kHz.

Second low pass filter 224 has the same basic design as the first low pass filter 210 with one exception. Combiner 200 contains, or is located near the ground block 220. Consequently, a good earth ground connection can usually be found somewhere nearby. Low pass filter 210 uses this local earth ground to remove high frequency signals through capacitors 406 and 414. Splitter 202 on the other hand is usually in a room inside the subscriber's building. It is possible that no nearby earth ground connection exists. As a result, second low pass filter 224 has only one capacitor 416 connected from the junction between a third pair of inductors 418 and 420 to a junction between a fourth pair of inductors 422 and 424. Resistors 423 and 425 are connected across part of inductors 418 and 422 respectively. Inductors 418 and 422 are also dc coupled to the inner conductor 212 and outer conductor 214 respectively of the home-run coaxial cable 204 through an F-fitting connector 426. Inductors 420 and 424 connect to the ring tip line 208 and ring line 206 respectively at an RJ-11 jack 428. The inductors 418, 420, 422 and 424 have values of 470 $\mu$H, and capacitor 416 has a value of 0.01 $\mu$F giving the second low pass filter 224 a roll off frequency of approximately 74 kHz.

The broadband signal enters the combiner 200 at an F-fitting connector 430. Information wire 216 passes through ground block 220 to capacitor 432. The other side of capacitor 432 connects to the inner conductor 212 of the home-run coaxial cable 204 through F-fitting connector 408. Reference ground 218 connects to the body of ground block 220 that is also connected to earth ground. Capacitor 434 connects reference ground 218 to the outer conductor 214 of the home-run coaxial cable 204 through F-fitting connector 408. Looking into the combiner 200 through F-fitting 430, the first high pass filter 222 is an RC filter comprising capacitors 432 and 434 and the inherent impedance of the home-run coaxial cable 204. Looking into the combiner 200 through F-fitting 408, the impedance of the home-run coaxial cable 204 is replaced by the impedance of the external coaxial cable (not shown) connected to the F-fitting 430. Capacitors 432 and 434 have values of 1000 pF, and the coaxial cables have an inherent impedance of 75 ohms producing a roll off frequency of approximately 4 MHz in the first high pass filter 222. Capacitors 432 and 434 also serve as the ac coupling between the information wire 216, reference ground 218 and the inner conductor 212 and the outer conductor 214 respectively. These capacitors 432 and 434 provide dc isolation for the home-run coaxial cable 204 from earth ground, and prevent the telephone electrical power from appearing on the broadband network.

The second high pass filter 226 is similar to the first high pass filter 222. A capacitor 436 connects the inner conductor 212 of the home-run coaxial cable 204 to the information wire 216 in an F-fitting connector 438 at the subscriber's location. A second capacitor 440 connects the outer conductor 214 of the home-run coaxial cable 204 to the reference ground of the F-fitting connector 438. Looking into the F-fitting 426, the second high pass filter 226 comprises capacitors 436 and 440 and the inherent impedance of the subscriber's coaxial cable (not shown) connected to F-fitting 438. Looking into F-fitting 438, the impedance of the second high pass filter 226 is supplied by the home-run coaxial cable 204. Capacitors 436 and 440 have values of 1000 pF, and the coaxial cables have an inherent impedance of 75 ohms giving the second high pass filter 226 a roll off frequency of approximately 4 MHz. As with capacitors 432 and 434 in the first high pass filter 222, the capacitors 436 and 440 in the second high pass filter 226 provide the ac coupling between the home-run coaxial cable 204 and the subscriber's coaxial cable (not shown) connected at F-fitting connector 438. This ac coupling prevents the telephone electrical power from being applied to the cable inputs of the subscriber's broadband and video equipment. The capacitors 436 and 440 also maintain home-run coaxial cable 204 isolation from any earth ground that may be introduced by the subscriber's equipment at F-fitting 438.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus that transports a telephone signal and a broadband signal between a first location and a second location along a coaxial cable comprising:

a first low pass filter at the first location dc coupling a first ring line of the telephone signal to an inner conductor of the coaxial cable, and dc coupling a first tip line of the telephone signal to an outer conductor of the coaxial cable;

a first high pass filter at the first location ac coupling a first information wire of the broadband signal to the inner conductor of the coaxial cable, and ac coupling a first reference ground of the broadband signal to the outer conductor of the coaxial cable;

a second low pass filter at the second location dc coupling a second ring line of the telephone signal to the inner conductor of the coaxial cable, and dc coupling a second tip line of the telephone signal to the outer conductor of the coaxial cable;

a second high pass filter at the second location ac coupling a second information wire of the broadband signal to the inner conductor of the coaxial cable, and ac coupling a second reference ground of the broadband signal to the outer conductor of the coaxial cable.

2. The apparatus of claim 1 further comprising a ground block at the first location connecting the first information wire and the first reference ground to the first high pass filter, and connecting the first reference ground to an earth ground.

3. The apparatus of claim 1 wherein the first low pass filter, the second low pass filter, the first high pass filter, and the second high pass filter have a first, a second, a third, and a fourth roll off frequency respectively in a range from approximately 50 kilohertz to approximately 5 megahertz, and wherein the first and second roll off frequencies are below the third and fourth roll off frequencies.

4. The apparatus of claim 1 wherein the first low pass filter comprises a first pair of inductors connected in series between the first ring line of the telephone signal and the inner conductor of the coaxial cable at the first location, a first capacitor connected from a first junction between the first pair of inductors to an earth ground, a second pair of inductors connected in series between the first tip line of the telephone signal and the outer conductor of the coaxial cable at the first location, and a second capacitor connected from a second junction between the second pair of inductors to the earth ground.

5. The apparatus of claim 1 wherein the second low pass filter comprises a third pair of inductors connected in series between the second ring line of the telephone signal and the inner conductor of the coaxial cable at the second location, a fourth pair of inductors connected in series between the second tip line of the telephone signal and the outer conductor of the coaxial cable at the second location, and a third capacitor connected from a third junction between the third pair of inductors to a fourth junction between the fourth pair of inductors.

6. The apparatus of claim 1 wherein the first high pass filter comprises a fifth capacitor connected between the first information wire of the broadband signal and the inner conductor of the coaxial cable at the first location, and a sixth capacitor connected between the first reference ground of the broadband signal and the outer conductor of the coaxial cable at the first location.

7. The apparatus of claim 1 wherein the second high pass filter comprises a seventh capacitor connected between the second information wire of the broadband signal and the inner conductor of the coaxial cable at the second location, and an eighth capacitor connected between the second reference ground of the broadband signal and the outer conductor or the coaxial cable at the second location.

8. A method of transporting a telephone signal and a broadband signal between a first location and a second location along a coaxial cable comprising:

low pass filtering the telephone signal at the first location with a first low pass filter;

dc coupling the telephone signal filtered by the first low pass filter onto the coaxial cable at the first location;

high pass filtering the broadband signal at the first location with a first high pass filter;

ac coupling the broadband signal filtered by the first high pass filter onto the coaxial cable at the first location;

transporting the telephone signal and the broadband signal coupled to the coaxial cable from the first location to the second location;

dc coupling the telephone signal and the broadband signal transported by the coaxial cable to the second location to a second low pass filter;

low pass filtering the dc coupled telephone signal and broadband signal at the second location with the second low pass filter to isolate the telephone signal from the broadband signal;

ac coupling the telephone signal and the broadband signal transported by the coaxial cable to the second location to a second high pass filter; and high pass filtering the ac coupled telephone signal and broadband signal with the second high pass filter to isolate the broadband signal from the telephone signal.

9. The method of claim 8 wherein the broadband signal is defined by voltages between an information wire and a reference ground, the method further comprising connecting the reference ground to an earth ground at the first location before high pass filtering with the first high pass filter.

10. The method of claim 8 wherein the first low pass filter, the second low pass filter, the first high pass filter and the second high pass filter have a first, a second, a third and a fourth roll off frequency respectively in a range from approximately 50 kilohertz to approximately 5 megahertz, and wherein the first and second roll off frequencies are below the third and fourth roll off frequencies.

* * * * *